United States Patent
Hillier, III et al.

(10) Patent No.: US 8,416,785 B2
(45) Date of Patent: Apr. 9, 2013

(54) IMPLEMENTING GHOST PACKET REMOVAL WITHIN A RELIABLE MESHED NETWORK

(75) Inventors: Phillip Rogers Hillier, III, Rochester, MN (US); David Alan Shedivy, Rochester, MN (US); Kenneth Michael Valk, Rochester, MN (US); Bruce Marshall Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/764,193

(22) Filed: Apr. 21, 2010

(65) Prior Publication Data
US 2011/0261821 A1 Oct. 27, 2011

(51) Int. Cl.
*H04L 12/28* (2006.01)
(52) U.S. Cl.
USPC ............................. 370/394; 370/312; 370/390
(58) Field of Classification Search .................. None
See application file for complete search history.

(56) References Cited

U.S. PATENT DOCUMENTS

| | | | |
|---|---|---|---|
| 7,822,889 B2 * | 10/2010 | Arimilli et al. | 710/38 |
| 2006/0087964 A1 * | 4/2006 | Valk | 370/218 |
| 2011/0228783 A1 * | 9/2011 | Flynn et al. | 370/394 |
| 2011/0235652 A1 * | 9/2011 | Hillier et al. | 370/428 |
| 2011/0261821 A1 * | 10/2011 | Hillier et al. | 370/394 |
| 2011/0283028 A1 * | 11/2011 | Byers et al. | 710/107 |

\* cited by examiner

*Primary Examiner* — Robert Wilson
(74) *Attorney, Agent, or Firm* — Joan Pennington

(57) ABSTRACT

A method and circuit for implementing multiple active paths between source and destination devices in an interconnect system while removing ghost packets, and a design structure on which the subject circuit resides are provided. Each packet includes a generation ID and is assigned an End-to-End (ETE) sequence number in the source interconnect chip that represents the packet position in an ordered packet stream from the source device. The packets are transmitted from a source interconnect chip source to a destination interconnect chip on the multiple active paths. The generation ID of a received packet is compared with a current generation ID at a destination interconnect chip to validate packet acceptance. The destination interconnect chip uses the ETE sequence numbers to reorder the accepted received packets into the correct order before sending the packets to the destination device.

20 Claims, 14 Drawing Sheets

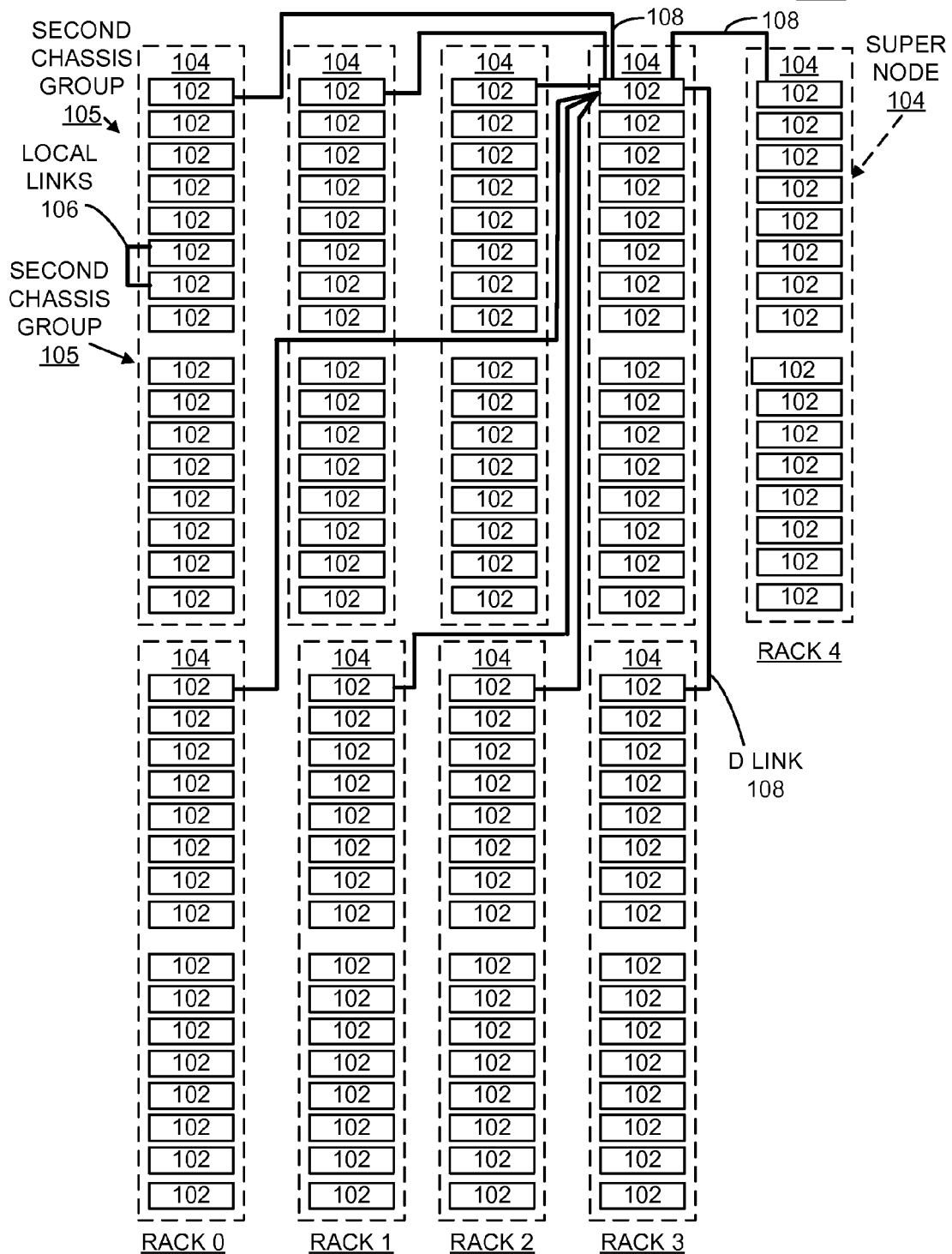

IMPLEMENTING GHOST PACKET REMOVAL WITHIN A RELIABLE MESHED NETWORK

FIELD OF THE INVENTION

The present invention relates generally to the data processing field, and more particularly, relates to a method and circuit for implementing multiple active paths between source and destination devices in an interconnect system while removing ghost packets, and a design structure on which the subject circuit resides.

DESCRIPTION OF THE RELATED ART

It is desirable to replace multiple interconnects, such as Ethernet, Peripheral Component Interconnect Express (PCIe), and Fibre channel, within a data center by providing one local rack interconnect system. When building an interconnect system or network it generally is an advantage to build the network interconnect system as a multiple path network interconnect system, where traffic from a particular source to a particular destination takes many paths through the network interconnect system, verses building the network interconnect system as a single-path, where all packets from a particular source to a particular destination all take the same path through the network interconnect system.

Network interconnect systems often have redundant paths between endpoints in order to allow the network to survive the failure of one or more components. When switching to an alternate path on the network, there is the possibility of packets being stuck on the original path; these packets are called ghost packets.

If these ghost packets become unstuck at the wrong time, they can reach the destination endpoint and take the place of legitimate packets being transmitted on the alternate path.

One known solution to the problem of ghost packets replacing legitimate packets provides a packet life timer that kills a packet that exists for too long and controls alternate route switching such that all potential ghost packets are killed before any new packets are sent on an alternate route. This solution requires an additional field in the packets to hold the life timer and a life timer delay before the alternate route switchover.

A need exists for an effective method and circuit to implement multiple active paths between source and destination devices in a meshed local rack interconnect system while effectively removing ghost packets.

SUMMARY OF THE INVENTION

Principal aspects of the present invention are to provide a method and circuit for implementing multiple active paths between source and destination devices in an interconnect system while removing ghost packets, and a design structure on which the subject circuit resides. Other important aspects of the present invention are to provide such method, circuitry, and design structure substantially without negative effect and that overcome many of the disadvantages of prior art arrangements.

In brief, a method and circuit for implementing multiple active paths between source and destination devices in an interconnect system while removing ghost packets, and a design structure on which the subject circuit resides are provided. Each packet includes a generation ID and is assigned an End-to-End (ETE) sequence number in the source interconnect chip that represents the packet position in an ordered packet stream from the source device. The packets are transmitted from a source interconnect chip source to a destination interconnect chip on the multiple active paths. The generation ID of a received packet is compared with a current generation ID at a destination interconnect chip to validate packet acceptance. The destination interconnect chip uses the ETE sequence numbers to reorder the accepted received packets into the correct order before sending the packets to the destination device.

In accordance with features of the invention, when a source interconnect chip is required to retransmit packets to the destination interconnect chip, the source interconnect chip stops transmitting packets and negotiates an update of the generation ID with the destination interconnect chip. The destination interconnect chip discards all packets in its packet receive buffer, and drops any received packets with the old generation ID. The destination interconnect chip sends an ETE acknowledge message with a next expected ETE sequence number. The source interconnect chip discards each packet acknowledged by the next expected ETE sequence number. The source interconnect chip transmits the packet with the updated generation ID and the next expected ETE sequence number.

In accordance with features of the invention, an intermediate interconnect chip includes a self-destruct timer circuit that is provided within packet queues in order to remove or drop long-lived packets. The self-destruct timer circuit includes a forward progress latch that is reset when a queue stage is loaded, a programmable timer that asserts a programmable timer signal, such as for 1 cycle every X cycles. When the queue stage is valid, and the timer signal is asserted, then the forward progress latch is set. When the queue stage is valid, the forward progress latch is set, and the timer signal is asserted again, then the queue entry is deleted.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1A, 1B, 1C, 1D, and 1E are respective schematic and block diagrams illustrating an exemplary local rack interconnect system for implementing multiple active paths between source and destination in a meshed local rack interconnect system while removing ghost packets in accordance with the preferred embodiment;

DETAILED DESCRIPTION OF THE PREFERRED EMBODIMENTS

Figure 1B:
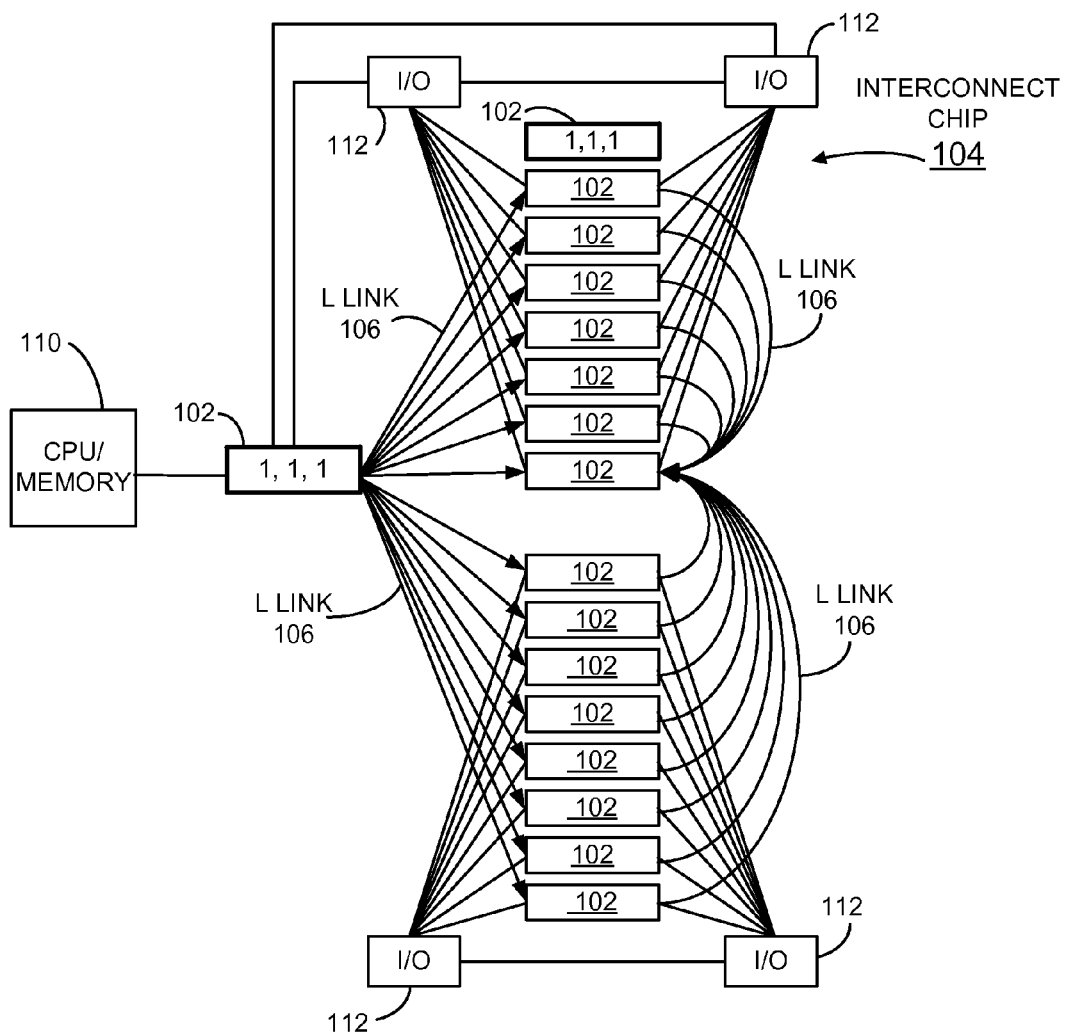

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing multiple active paths between source and destination while removing ghost packets.

Having reference now to the drawings, in FIG. 1A, there is shown an example multiple-path local rack interconnect system generally designated by the reference character 100 used for implementing multiple active paths between source and destination while removing ghost packets in accordance with the preferred embodiment. The multiple-path local rack interconnect system 100 supports computer system communications between multiple servers, and enables an Input/Output (I/O) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (×2) high-speed serial (HSS) link.

Figure 1C:
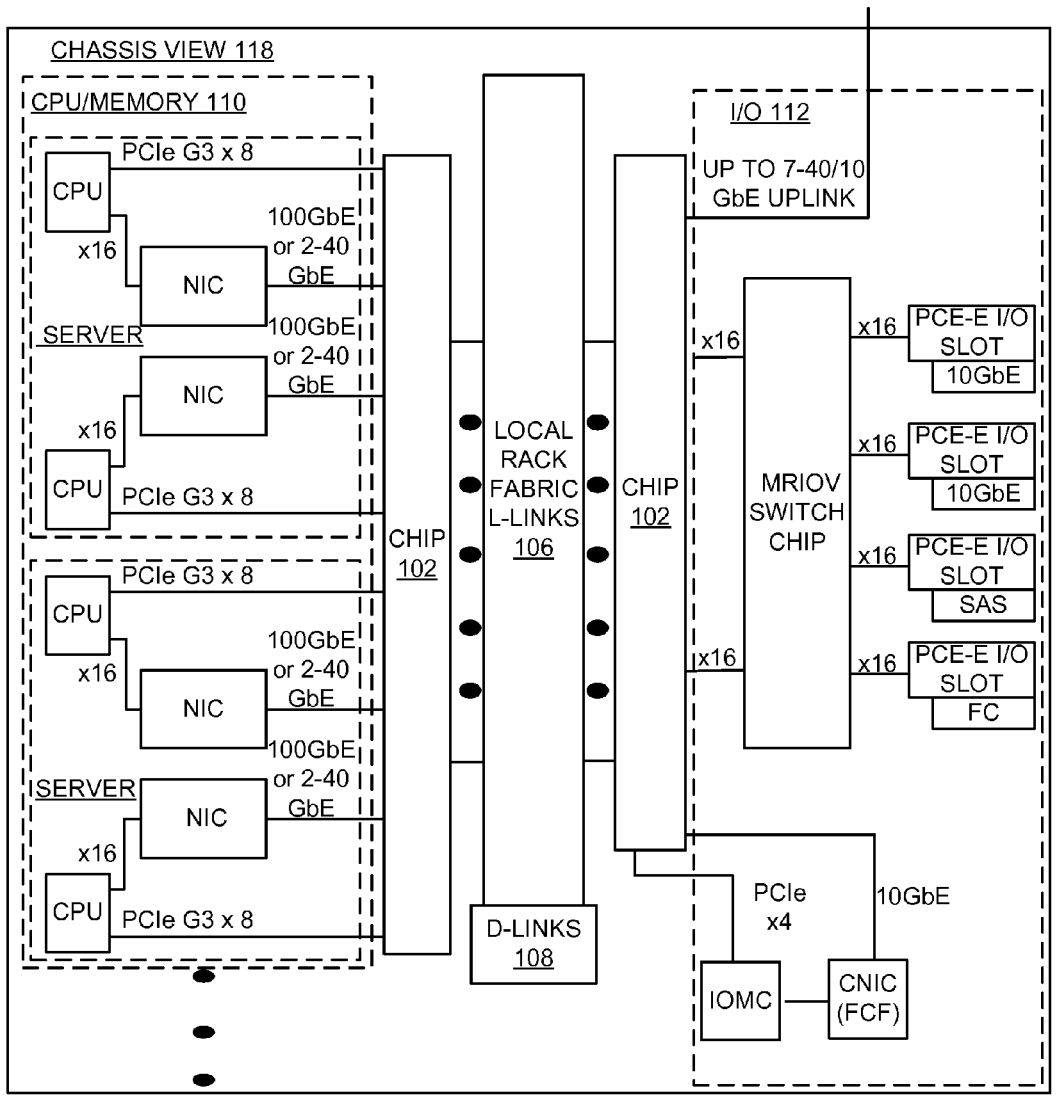
Figure 1D:
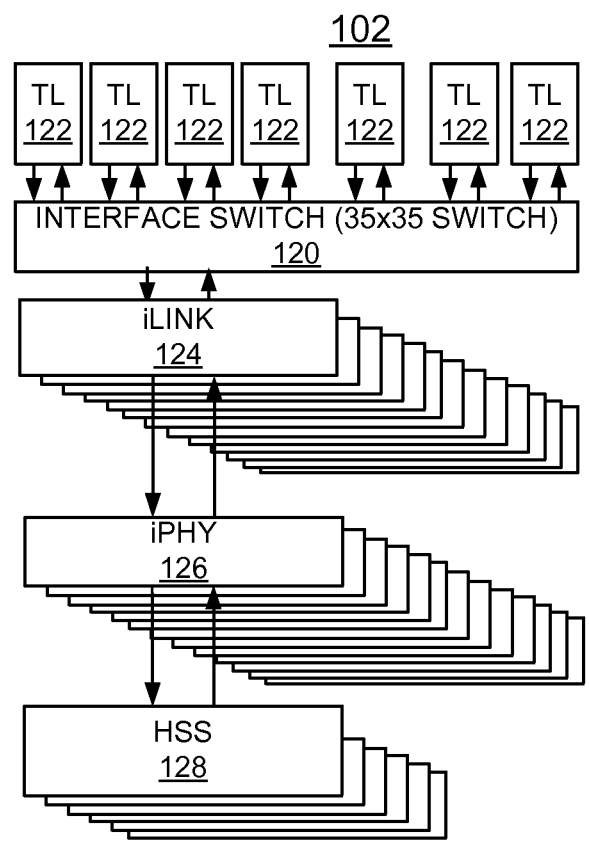
Figure 1E:
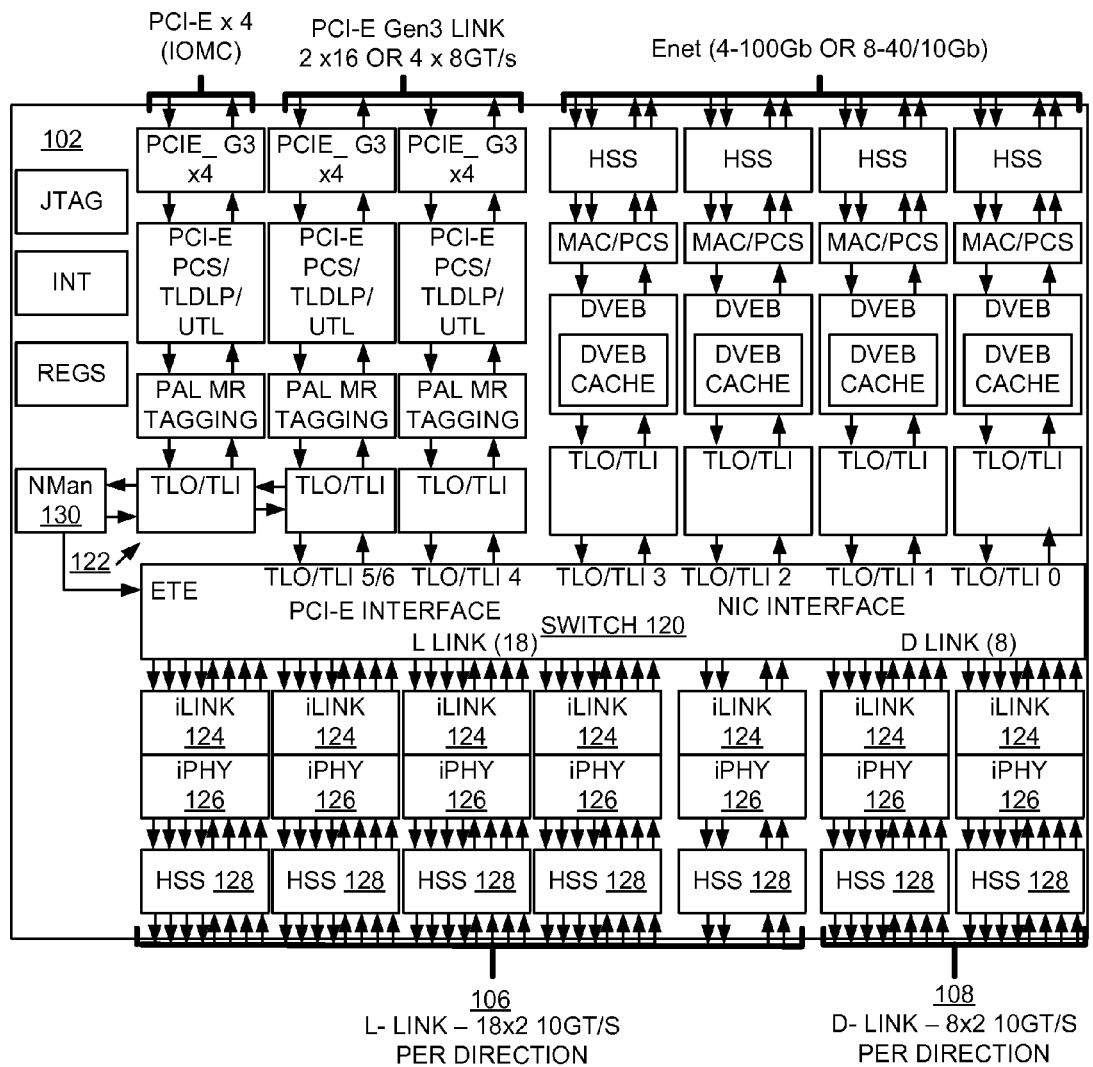

Referring also to FIG. 1E, each of the interconnect chips 102 of FIG. 1A includes, for example, 18 L-links 106, labeled 18×2 10 GT/S PER DIRECTION and 8 D-links 108, labeled 8×2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected to a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3×8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3×16 to an external MRIOV switch chip, with four ×16 to PCI-E I/O Slots with two Ethernet slots indicated 10 GbE, and two storage slots indicated as SAS (serial attached SCSI) and FC (fibre channel), a PCIe ×4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are transmitted onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7×8 full duplex cores providing the illustrated 26×2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E ×4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3×4, and PCIE_G3 2×8, PCIE_G3 2×8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, protocol methods and transport layer circuits are provided for implementing multiple active paths between source and destination while removing the threat of ghost packets. The features of the invention are achieved by providing two mechanisms including a Generation ID (GID) that is used to validate packet acceptance at the receiver or destination interconnect chip; and a simple self destruct timer circuit provided within packet queues of the networks hops in order to drop long lived packets.

Figure 2A:
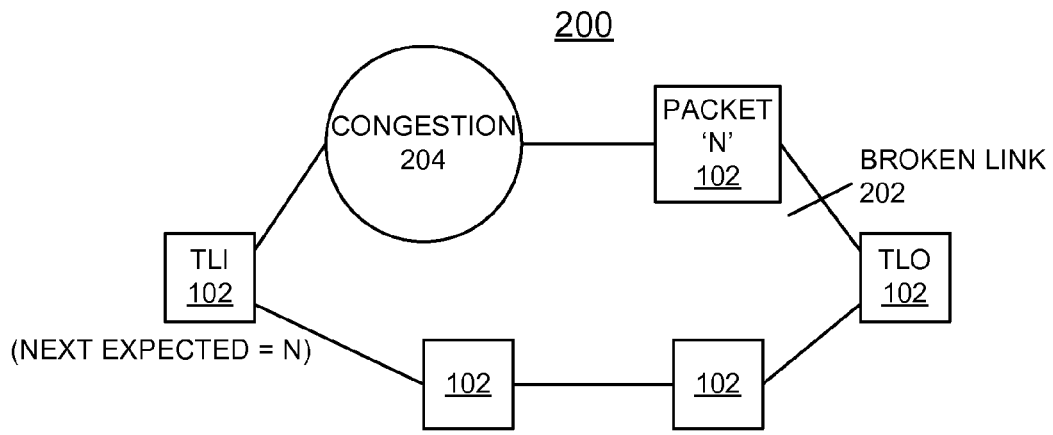
FIGS. 2A, 2B, and 2C are packet flow diagrams illustrating prior art ghost packet problems.
Figure 2B:
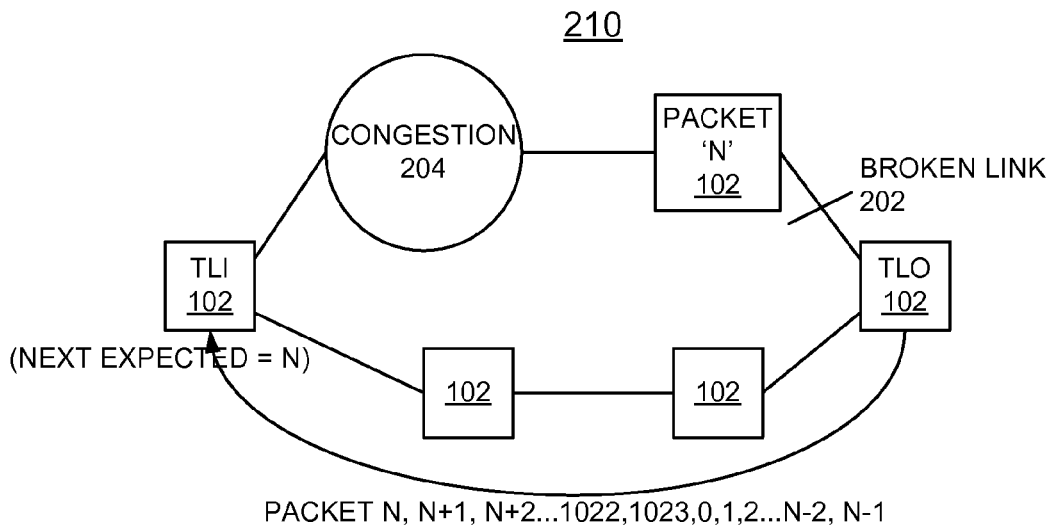
Figure 2C:
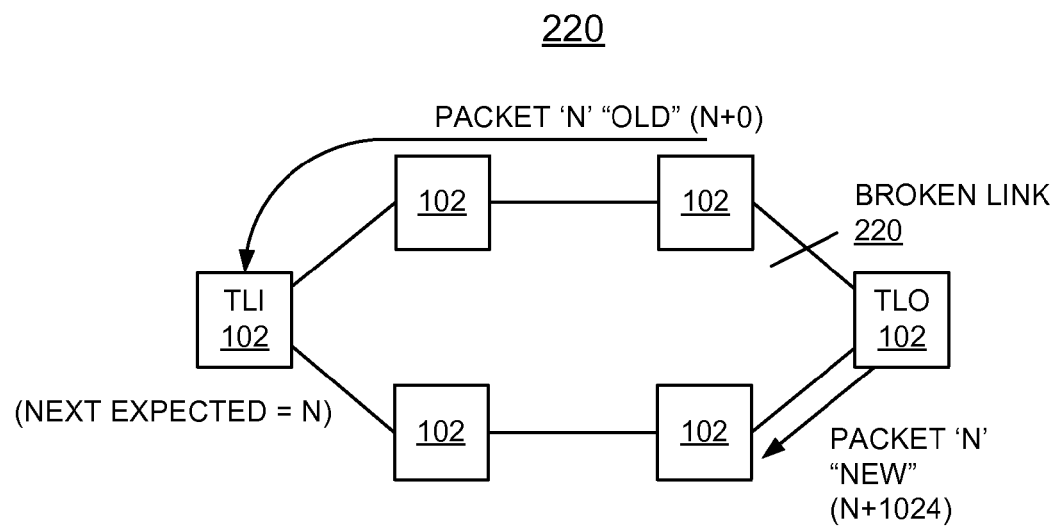

Referring now to FIGS. 2A, 2B, and 2C, there are shown packet flow diagrams illustrating prior art ghost packet problems.

In FIG. 2A, a first packet flow diagram generally designated by reference character 200 is shown a plurality of interconnect chips 102 with a broken link failure 202 between a source chip 102 shown with a source TLO and an intermediate interconnect chip 102. A point of congestion 204 is shown within the packet flow diagram 200 before a destination chip 102 shown with a destination TLI. The source TLO, chip 102 sends packets to the destination TLI, chip 102 and each packet is assigned an End-to-End (ETE) sequence number in the source interconnect chip that represents the packet position in an ordered packet stream from the source device. The destination interconnect chip uses the ETE sequence numbers to reorder the received packets into the correct order before sending the packets to the destination device attached to the destination chip 102. In FIG. 2A the destination TLI, chip 102 is expecting a next packet with the ETE sequence number=N, and the packet with the ETE sequence number=N is shown held up by congestion or stuck at the intermediate interconnect chip 102 next to the source TLO labeled PACKET 'N'.

In FIG. 2B, a second packet flow diagram generally designated by reference character 210 is shown with packets retransmitted on an alternate path indicated by a line labeled PACKET N, N+1, N+2, . . . 1022, 1023, 0, 1, 2, . . . N−2, N−1 from the source TLO, chip 102 to the destination TLI, chip 102. The congestion 204 remains, the packet with the ETE sequence number=N remains stuck, and the destination TLI, chip 102 is expecting a next packet with the ETE sequence number=N.

In FIG. 2C, a third packet flow diagram generally designated by reference character 220 is shown with packets retransmitted on the alternate path indicated by a line with a new packet labeled PACKET 'N', "NEW", (N+1024) from the source TLO, chip 102 to the destination TLI, chip 102. In FIG. 2C, the congestion 204 is removed, and the illustrated stuck packet with the ETE sequence number=N shown in FIG. 2A is released and sent to the destination TLI, chip 102 as indicated by a line with the packet labeled PACKET 'N', "OLD", (N+0). The old packet PACKET 'N', "OLD", (N+0) is used twice and the new packet PACKET 'N', "NEW", (N+1024) is not used at all.

In accordance with features of the invention, a generation ID is provided with the packets that is used to validate packet acceptance at the destination interconnect chip 102. Each packet includes a generation ID and is assigned an End-to-End (ETE) sequence number in the source interconnect chip that represents the packet position in an ordered packet stream from the source device. The destination interconnect chip uses the ETE sequence numbers to reorder the received packets into the correct order before sending the packets to the destination device. The destination interconnect chip compares the generation ID of a received packet with a current generation ID at a destination interconnect chip to validate packet acceptance.

In accordance with features of the invention, an advantage of using the generation ID is that limited packet overhead is required by the generation ID, where only a small number of bits is required as compared to large number of bits for a packet life timer in prior art arrangements. Another advantage is that the 100% destruction of long lived packets within the network is provided without incurring the life timer field overhead or implementation of a complex mechanism to track packet progress in order to determine appropriate time to destroy a given packet.

Figure 3:
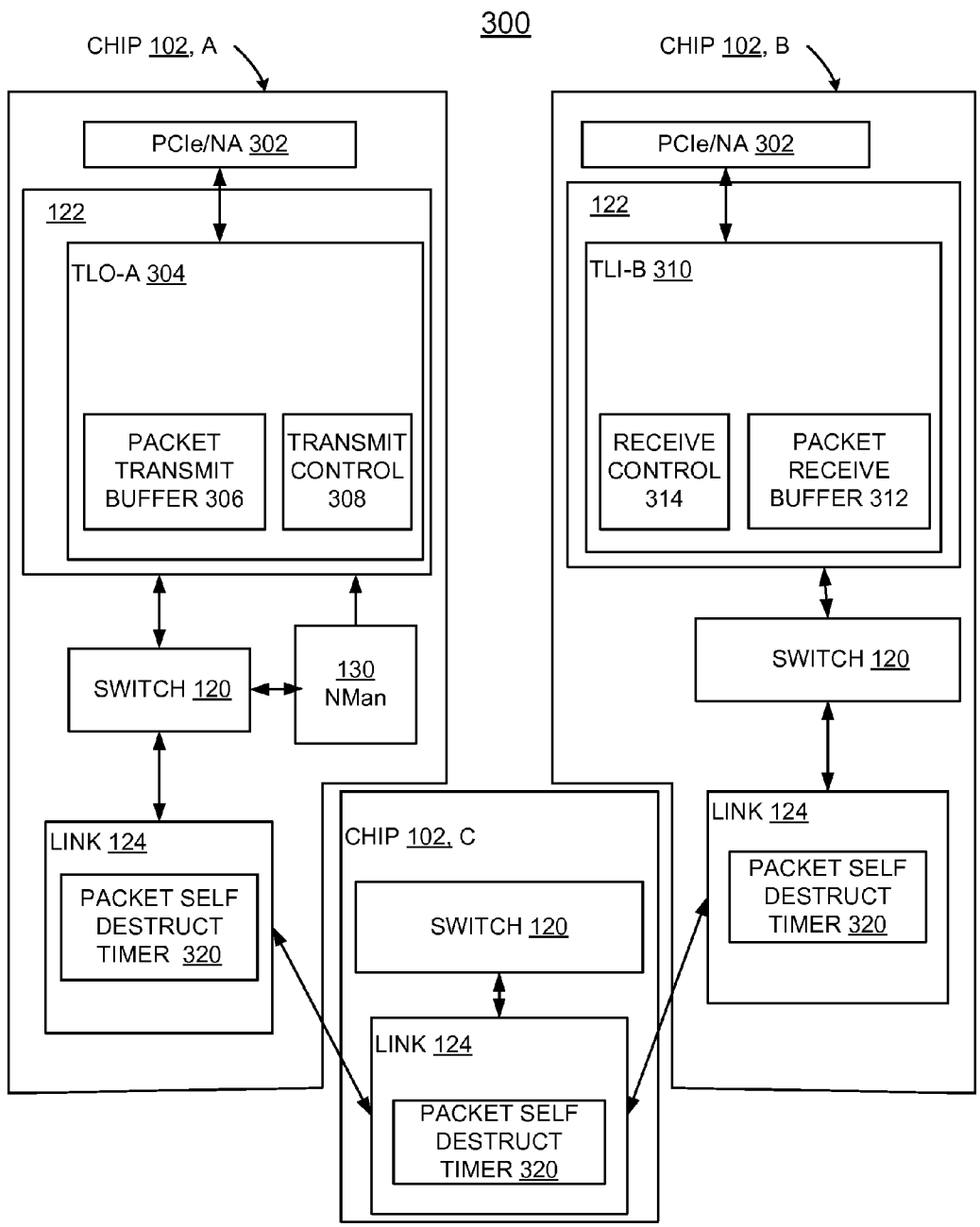
FIG. 3 is a schematic and block diagram illustrating a circuit for implementing multiple active paths between source and destination while removing ghost packets in accordance with the preferred embodiment.

Referring now to FIG. 3, there is shown a circuit generally designated by the reference character 300 for implementing multiple active paths between source and destination while removing the threat of ghost packets in accordance with the preferred embodiment. Circuit 300 and each interconnect chip 102 includes a respective Peripheral Component Interconnect Express (PCIe)/Network Adapter (NA) 302 or PCIe/NA 302, as shown included in an illustrated pair of interconnect chips 102 of a source interconnect chip 102, A, a destination interconnect chip 102, B, and an intermediate interconnect chip 102, C. Circuit 300 and each interconnect chip 102 includes a transport layer 122 including a respective transport layer out (TLO)-A 304, and a respective transport layer in (TLI)-B, 310.

Source TLO-A 304 includes a packet transmit buffer 206 for storing packets received from the high bandwidth PCIe/NA 302, and a transmit control 308 in accordance with the preferred embodiment. The network manager (NMan) 130 coupled to TLO-A 304 and interface switch 120 uses End-to-End (ETE) heartbeats for identifying available links by sending ETE heartbeats across local links 106, 108 in the multiple-path local rack interconnect system 100.

Circuit 300 and each interconnect chip 102 includes a respective transport layer in (TLI)-B 310, as shown in FIG. 3. Each TLI-B 310 includes a packet receive buffer 312 providing packet buffering and a receive control 314 in accordance with the preferred embodiment. Circuit 300 and each interconnect chip 102 includes the interconnect switch 120 and link layer 124. Circuit 300 and each interconnect chip 102 includes a packet self-destruct timer circuit 320 in accordance with the preferred embodiment.

The transmit control 308 and source TLO-A 304 provide each packet with the GID and ETE sequence number, and packets are transmitted over multiple paths to the receive control 314 and destination TLI-B 310. The receive control 314 and destination TLI-B 310 compares the generation ID of a received packet with a current generation ID at a destination interconnect chip to validate packet acceptance and uses the ETE sequence numbers to reorder the received packets into the correct order before sending the packets to the destination device.

In accordance with features of the invention, circuit 300 and each interconnect chip 102 includes a self-destruct timer circuit 320 that is provided within queues of the networks hops in order to drop long-lived packets. The self-destruct timer circuit includes a forward progress latch that is reset when a queue stage is loaded, a programmable timer that asserts a programmable timer signal, such as for 1 cycle every X cycles. When the queue stage is valid, and the timer signal is asserted, then the forward progress latch is set. When the forward progress latch is set, the queue stage is valid, and the timer signal is asserted again, then the queue entry is deleted.

Figure 4A:
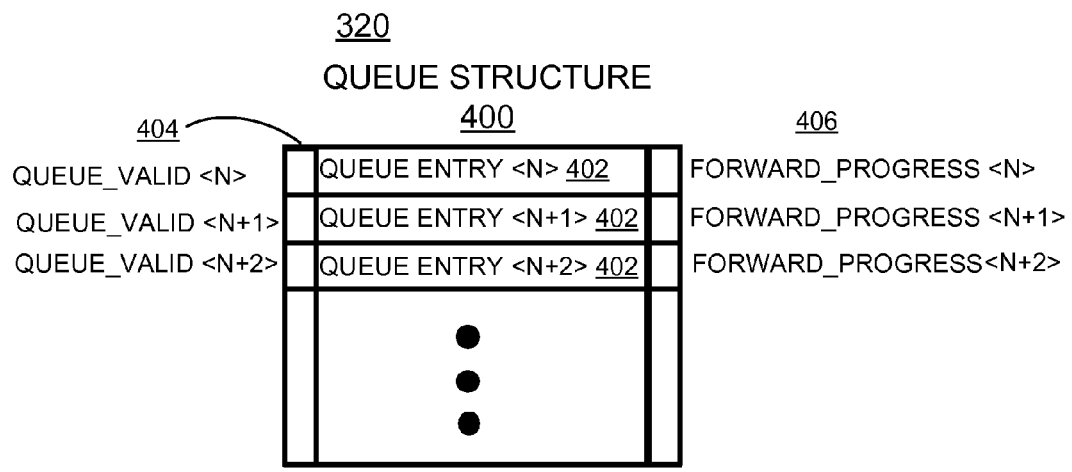
FIGS. 4A, 4B, and 4C are schematic and block diagrams illustrating a packet self destruct timer circuit for implementing removal of long lived packets in accordance with the preferred embodiment.
Figure 4B:
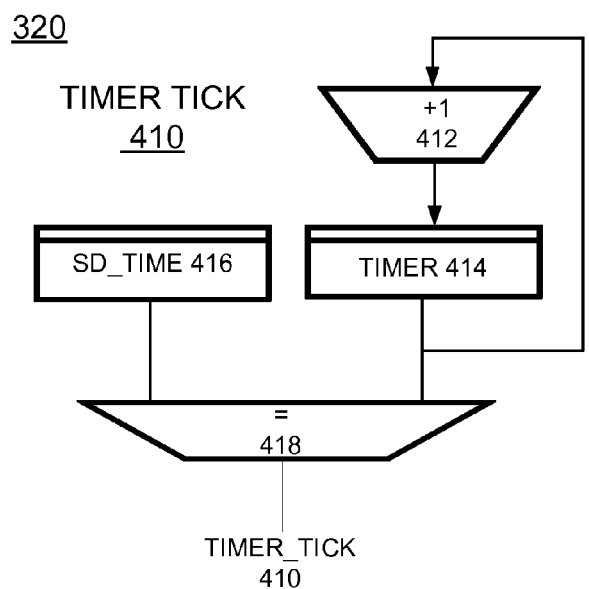
Figure 4C:
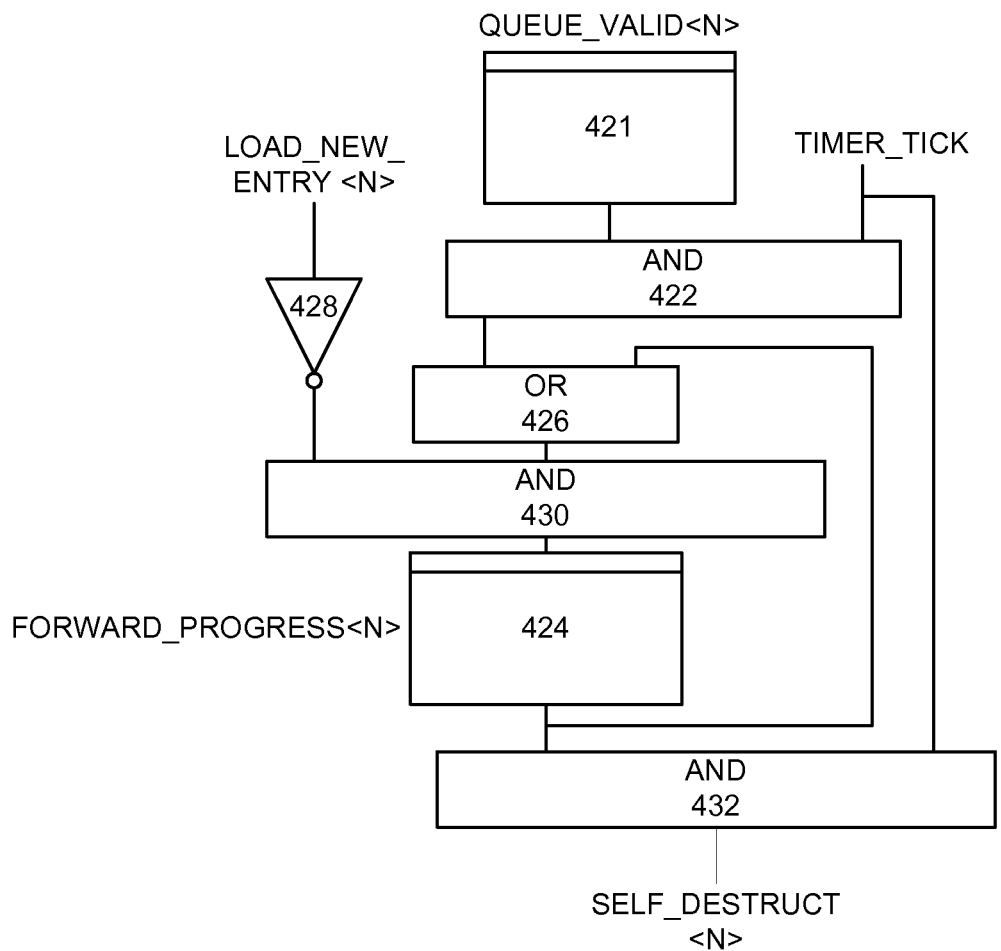

FIGS. 4A, 4B, and 4C together illustrate the packet self-destruct timer circuit 320 for implementing removal of long lived packets in accordance with the preferred embodiment.

As shown in FIG. 4A, the packet self destruct timer circuit 320 includes a queue structure 400 including a respective queue entry <n>, <n+1>, <n+2>402 together with a respective queue valid <n>, <n+1>, <n+2>404, and a respective forward progress <n>, <n+1>, <n+2>406.

FIG. 4B illustrates a timer tick 410 of the packet self-destruct timer circuit 320. The timer tick 410 is a programmable chip timer tick used to determine if progress is being made. The timer tick 410 includes an increment 412 providing an output to a timer interface 414, and having an input from an output of the timer 414, and a self-destruct (SD) time 416. An output of the SD time and the output of the timer 414 are applied to a compare 418, which generates an output timer tick. The output timer tick of the timer tick 410 is asserted for 1 cycle each X cycles, where X cycles is equal to the value of the programmable self-destruct (SD) time 416.

FIG. 4C illustrates a self-destruct formation 420 of the packet self-destruct timer circuit 320. The self-destruct formation 420 is implemented as one forward progress latch per queue entry or pipeline stage along the internal route of the packet. The self-destruct formation 420 includes an interface queue valid <n> 421, coupled to a first input of a first AND gate 422. The output timer tick of timer tick 410 is applied to the second input of the first AND gate 422. An output of AND gate 422 and an output of an interface forward progress <n> 424 are respectively coupled to a first input and a second input of an OR gate 426 The output of OR gate 426 and a load new entry <n> coupled via an inverter 428 are applied to a second AND gate 430. The output of AND gate 430 is applied to the forward progress interface 424. When the queue or pipeline stage is valid and the timer tick is asserted, then the forward progress latch is set. The forward progress latch 424 is reset when the queue or pipeline stage being loaded. The output of the forward progress interface 424 and the output timer tick of timer tick 410 are applied to a third AND gate 432. When the queue or pipeline stage advances, then it is loaded with new information and the forward progress latch is reset or the entry marked as invalid. The AND gate 432 provides an output self destruct <n>, which resets the queue valid <n>. When the forward progress latch is set or equal to 1, the entry is valid and the timer tick is asserted again, the entry is deleted, thus getting rid of any potential ghost packet.

Figure 5:
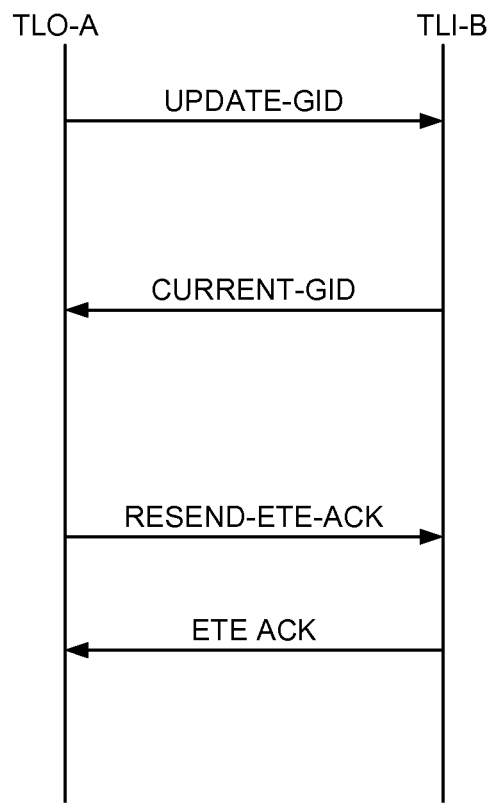
FIGS. 5, 6, and 7 are flow charts illustrating exemplary operations performed by the circuit of FIG. 2 for implementing multiple active paths between source and destination while removing ghost packets in accordance with the preferred embodiment.
Figure 6:
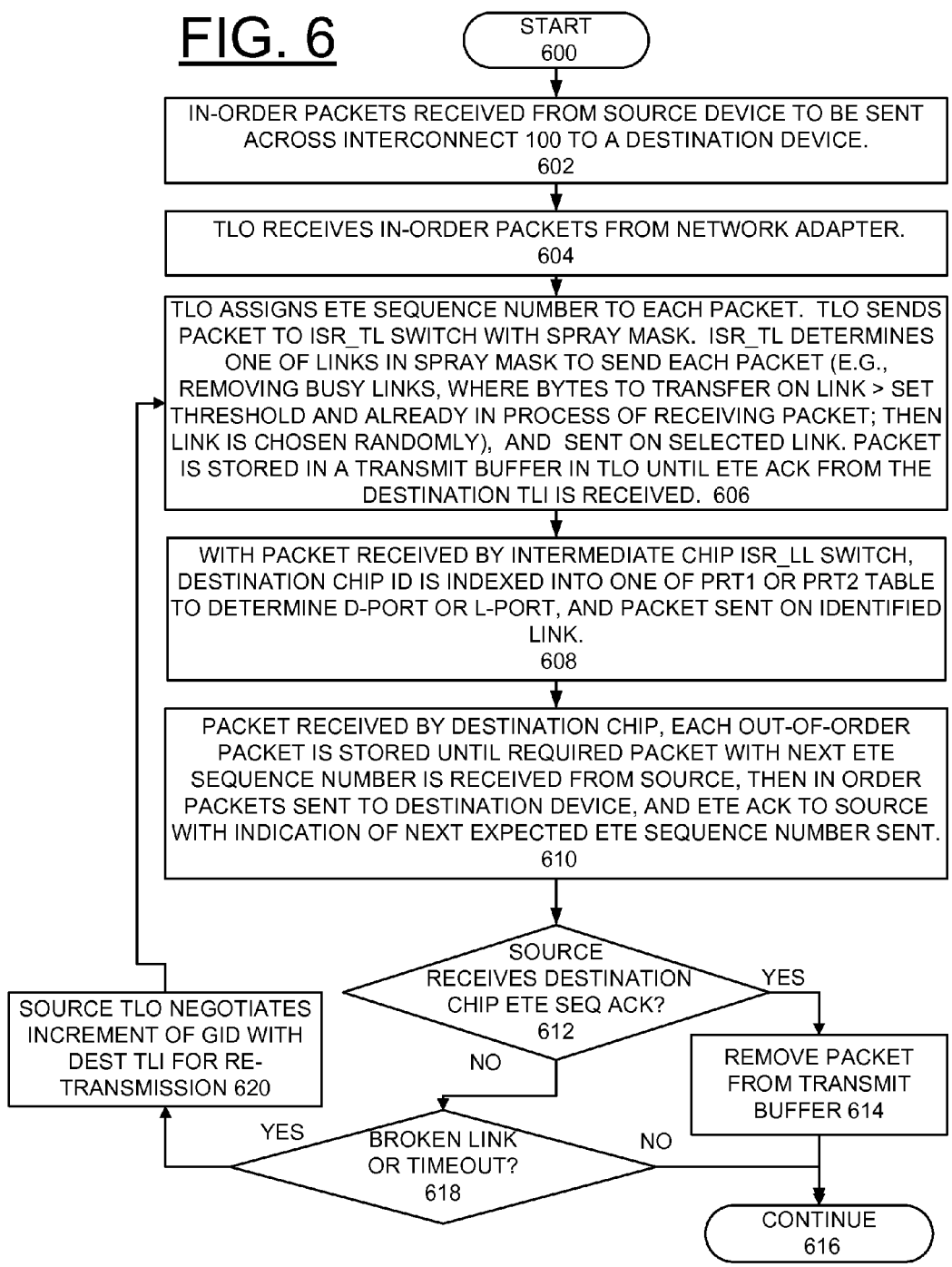
Figure 7:
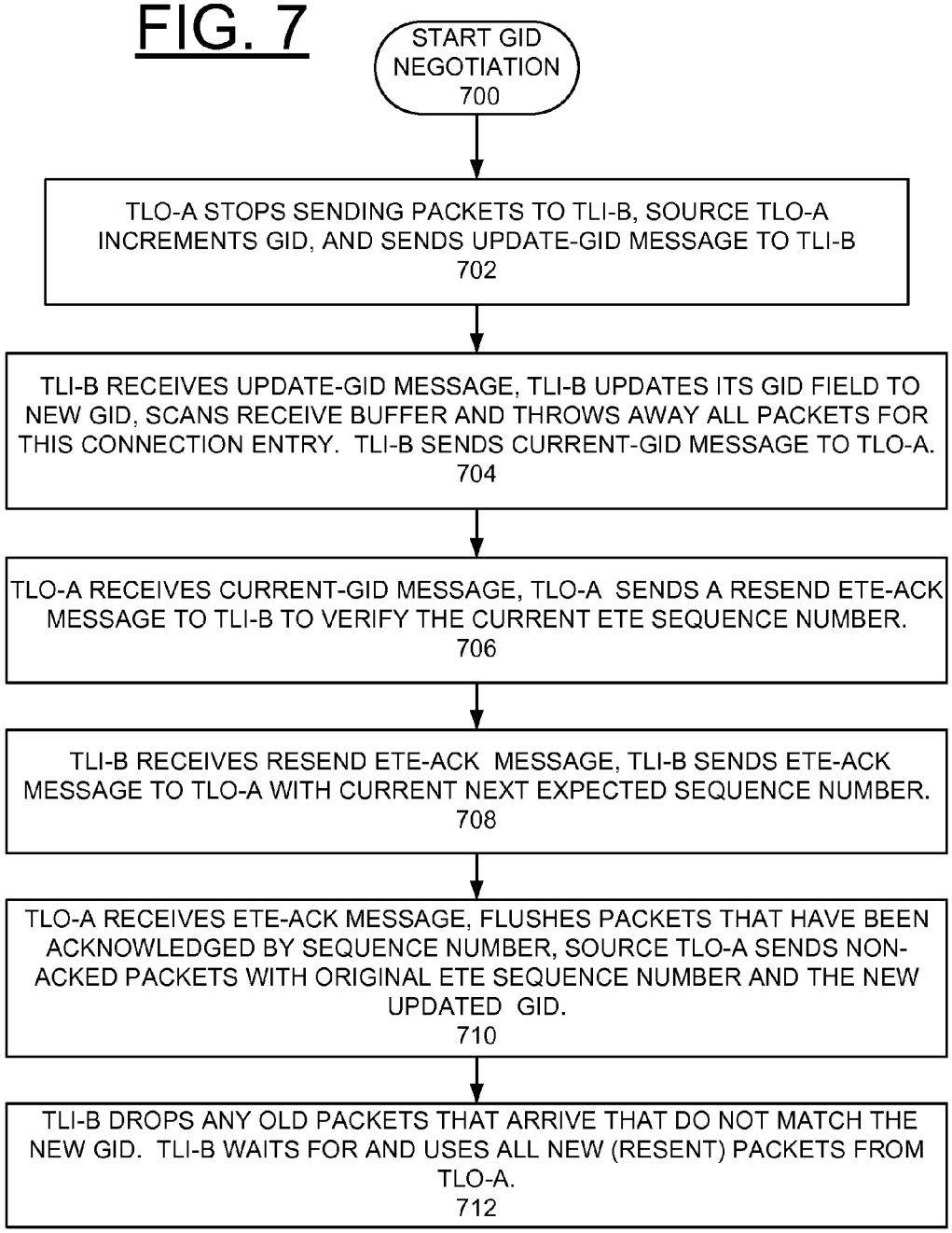

FIGS. 5, 6, and 7 are flow charts illustrating exemplary operations performed by the circuit 300 for implementing multiple active paths between source and destination while removing ghost packets in accordance with the preferred embodiment.

In FIGS. 5 and 7, there are shown exemplary operations performed by the circuit 300 for negotiating an updated GID and GID handshaking between the TLO 304 of the source interconnect chip 102 and the TLI 310 of the destination interconnect chip 102 in accordance with the preferred embodiment.

Referring first to FIG. 6, there are shown exemplary operations performed by the circuit 300 for implementing ordered and reliable transfer of packets over multiple links, and preventing ghost packet problems starting at a block 400. Packets are received from a source device to be sent across multiple paths in the multiple-path local rack interconnect system 100 to a destination device as indicated at a block 602. The received packets from the source device are in-order. The TLO 304 of the source interconnect chip 102 receives the in-order packets from the PCIe/NA 302 as indicated at a block 604.

As indicated at a block 606, the TLO 304 assigns an End-to-End (ETE) sequence number to each packet and sends each packet with a spray mask to the interconnect switch 120. The interconnect switch 120 determines the link to send the packet. The spray mask is used by the interconnect switch 120 on the source interconnect chip 102 to determine which one of the links in the spray mask to use to send the packet. The first step in choosing a link is to remove any links from the spray mask that are busy. The interconnect switch 120 indicates that a particular link is busy when the number of bytes to transfer on the link is above a programmable threshold. The next step is to remove any link from the spray mask that is already in the process of receiving a packet from the switch partition 120 that originated from a different source device. From the remaining links in the spray mask, a link is randomly chosen by the interconnect switch 120 to allow for a generally uniform distribution of packets across all eligible links. The interconnect switch 120 sends each packet on the selected link. The TLO 304 of the source interconnect chip 102 assigns the ETE sequence number to each packet in sequential order based upon the destination device. This means that each source interconnect chip 102 keeps track of the next ETE sequence number to use for each combination of source device and destination device. The source interconnect chip 102 stores the packet in a retry transmit buffer in the TLO 304 until an ETE sequence number acknowledge is received from the destination TLI-B, 310 indicating that the packet has been sent to the destination device.

As indicated at a block 608, with a packet received by an intermediate chip 102, the interconnect switch 120 handles switching such packets that are received from a link and are sent out on another link. The intermediate chip 102 uses the destination chip identification that is indexed into one of a pair of port tables PRT1 or PRT2 to identify a particular D-port or L-port, and the packet is sent on the identified link.

As indicated at a block 610, when the packet is received by the destination chip 102, each out-of-order packet is buffered, and when the packet with the next required ETE sequence number is received, then the buffered packets are transferred in the correct order to the destination device, sending the ETE sequence number acknowledge to the source interconnect chip 102. The destination interconnect chip 102 provides this notification by returning the ETE sequence number acknowledge to the source interconnect chip 102 with an indication of the next expected ETE sequence number that the destination interconnect chip 102 is expecting to receive.

As indicated at a decision block 612, the source interconnect chip 102 checks for the ETE sequence number acknowledge from the destination chip. When the ETE sequence number acknowledge is received from the destination chip the source interconnect chip 102 then removes any packets from its retry buffer that have an ETE sequence number that is less than the received next expected ETE sequence number as indicated at a block 614. Then sequential operations continue as indicated at a block 616.

When either a broken link is indicated by missing heartbeats or a timeout for ETE sequence number acknowledge from the destination chip is identified as indicated at a decision block 618, then the source TLO negotiates an increment of a generation identification (GID) with the TLI of the destination interconnect chip 102 for packet retransmission as indicated at a block 620. Example operations for negotiating an updated generation ID and removing ghost packets are illustrated and described with respect to FIGS. 5 and 7.

Then the operations continue at block 606 for resending the packet with the assigned End-to-End (ETE) sequence number and incremented GID. Otherwise the sequential operations continue at block 616.

Referring now to FIGS. 5 and 7, there are shown exemplary operations performed by the circuit 300 for implementing or negotiating an updated generation ID starting at a block 700 in FIG. 7. As indicated at a block 702, when a source interconnect chip is required to retransmit packets to the destination interconnect chip, the source interconnect chip TLO-A stops transmitting packets before negotiating an update of the generation ID with the destination interconnect chip TLI-B, and the TLO-A increments its GID and sends an update GID message to the TLI-B as indicated at line labeled UPDATE-GID in FIG. 5.

As indicated at a block 704, the destination TLI-B receives the update GID message, and updates its GID field to the new GID. The destination TLI-B discards all packets in the reorder packet receive buffer for this connection entry. The TLI-B sends a current GID message to the source interconnect chip TLO-A as indicated at line labeled CURRENT-GID in FIG. 5.

As indicated at a block 706, the source TLO-A receives the current GID message and sends a resend ETE acknowledge message to the TLI-B as indicated at line labeled RESEND-ETE-ACK in FIG. 5. As indicated at a block 708, the destination TLI-B receives the resend ETE acknowledge message, and sends an ETE acknowledge message with the current next expected sequence number to the TLO-A B as indicated at line labeled ETE-ACK in FIG. 5.

As indicated at a block 710, the source TLO-A receives the ETE acknowledge message with the current next expected sequence number and discards each packet acknowledged by the next expected ETE sequence number. The source interconnect chip transmits the non-acknowledged packets with the updated generation ID and the original ETE sequence numbers.

As indicated at a block 712, the destination interconnect chip TLI-B discards any received packets with the old generation ID. The destination interconnect chip TLI-B waits for and uses all new packets from the TLO-A.

Figure 8:
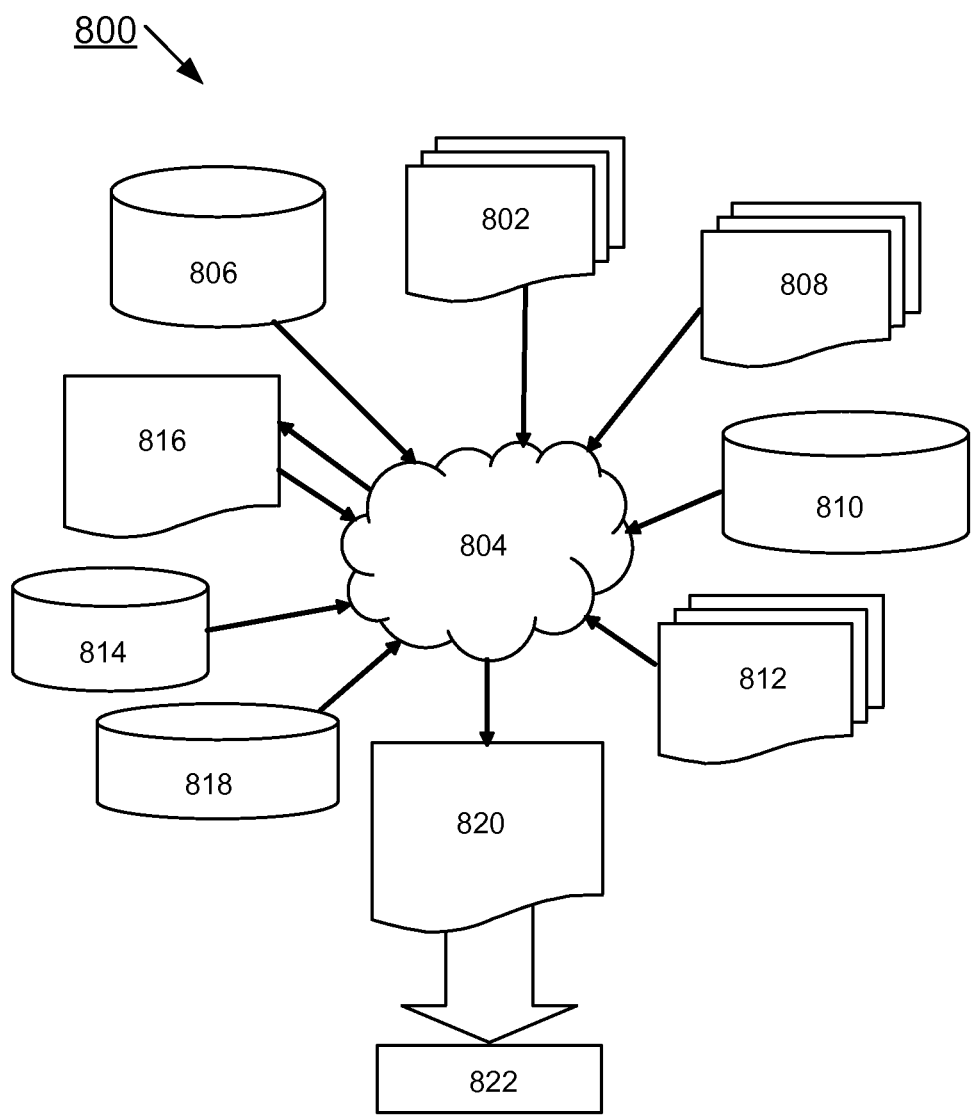
FIG. 8 is a flow diagram of a design process used in semiconductor design, manufacturing, and/or test.

FIG. 8 shows a block diagram of an example design flow 800 that may be used for circuits 300, 320 and the interconnect chip 102 described herein. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises circuits 102, 300, 320 in the form of schematics or HDL, a hardware-description language, for example, Verilog, VHDL, C, and the like. Design structure 802 may be contained on one or more machine readable medium. For example, design structure 802 may be a text file or a graphical representation of circuits 102, 300, 320. Design process 804 preferably synthesizes, or translates, circuits 102, 300, 320 into a netlist 808, where netlist 808 is, for example, a list of wires, transistors, logic gates, control circuits, I/O, models, etc. that describes the connections to other elements and circuits in an integrated circuit design and recorded on at least one of machine readable medium. This may be an iterative process in which netlist 808 is resynthesized one or more times depending on design specifications and parameters for the circuits.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 1A-1E, 3, 4A, 4B, 4C, 5, 6, and 7 along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, 3, 4A, 4B, 4C, 5, 6, and 7. Design structure 820 may then proceed to a stage 822 where, for example, design structure 820 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for sending packets between a source device and a destination device using multiple active paths while removing ghost packets, said method comprising:
   creating a plurality of packets with a generation identifier (ID) and an End-to-End (ETE) sequence number;
   transmitting the plurality of packets from a source interconnect chip source to a destination interconnect chip via multiple active paths; and
   responsive to receiving the plurality of packets, comparing the generation identifier in a packet of the plurality of packets with a current value of the generation ID of the packet of the plurality of packets to determine whether the packet is a valid packet, reordering the received valid packets into a correct order based upon the ETE sequence number before sending a validated plurality of packets to the destination device.

2. The method as recited in claim 1 further includes responsive to a source interconnect chip being required to retransmit the plurality of packets to the destination interconnect chip, the source interconnect chip negotiates an update of the generation ID with the destination interconnect chip.

3. The method as recited in claim 2 includes the source interconnect chip incrementing the current generation ID to provide an updated generation ID (GID) and sending an update GID message to the destination interconnect chip.

4. The method as recited in claim 3 includes the destination interconnect chip discarding all of the plurality of packets stored in a packet receive buffer from the source interconnect chip, and the destination interconnect chip sends an ETE acknowledge message with a next expected ETE sequence number to said source interconnect chip.

5. The method as recited in claim 4 includes the source interconnect chip discarding each packet of the plurality of packets acknowledged by the next expected ETE sequence number, and the source interconnect chip transmits packets starting with the next expected ETE sequence number with the updated generation ID.

6. The method as recited in claim 1 includes providing a packet self-destruct timer circuit with a packet queue in an interconnect chip to remove long-lived packets.

7. The method as recited in claim 1 wherein providing said packet self-destruct timer circuit includes providing a packet queue structure with a forward progress latch and a programmable timer for asserting a programmable timer signal; and deleting a packet queue entry responsive to the timer signal being asserted when said forward progress latch is set.

8. The method as recited in claim 1 includes providing a generation ID (GID) having a predefined number of bits.

9. A circuit for sending packets between a source device and a destination device using multiple active paths while removing ghost packets, said circuit comprising:
   a source interconnect chip coupled to a source device;
   a destination interconnect chip coupled to the destination device;
   a plurality of links defining the multiple active paths between said source interconnect chip and said destination interconnect chip;
   said source interconnect chip creating a plurality of packets with a generation identifier (ID) and an End-to-End (ETE) sequence number;
   said source interconnect chip transmitting the plurality of packets to a destination interconnect chip via multiple active paths; and
   said destination interconnect chip receiving the plurality of packets, comparing the generation identifier in a packet of the plurality of packets with a current value of the generation ID of the packet of the plurality of packets to determine whether the packet is a valid packet, reordering the received valid packets into a correct order based upon the ETE sequence number before sending a validated plurality of packets to the destination device.

10. The circuit as recited in claim 9 further includes said source interconnect chip being required to retransmit of the plurality of packets to the destination interconnect chip, said source interconnect chip negotiating an update of the generation ID with said destination interconnect chip.

11. The circuit as recited in claim 10 includes said source interconnect chip incrementing the current generation ID to provide an updated generation ID (GID) and sending an update GID message to said destination interconnect chip.

12. The circuit as recited in claim 11 includes said destination interconnect chip discarding all packets stored in a packet receive buffer from said source interconnect chip, and said destination interconnect chip sending an ETE acknowledge message with a next expected ETE sequence number to said source interconnect chip.

13. The circuit as recited in claim 12 includes said source interconnect chip discarding each packet of the plurality of packets acknowledged by said next expected ETE sequence number, and source interconnect chip transmits the plurality of packets starting with said next expected ETE sequence number with said updated generation ID.

14. The circuit as recited in claim 9 further includes a packet self-destruct timer circuit with a packet queue in an interconnect chip, said self-destruct timer circuit removing long-lived packets.

15. The circuit as recited in claim 14 wherein said packet self-destruct timer circuit includes a packet queue structure including a queue stage with a queue valid, and a forward progress latch; said forward progress latch being reset when said queue stage is loaded; a programmable timer for asserting a programmable timer signal; said forward progress latch being set when said timer signal is asserted and said queue stage is valid; and deleting a packet queue entry responsive to the timer signal being asserted when said forward progress latch is set.

16. A multiple-path local rack interconnect system comprising:
   a plurality of interconnect chips including a source interconnect chip coupled to a source device and a destination interconnect chip coupled to the destination device;
   a plurality of serial links connected between each of said plurality of interconnect chips;
   said source interconnect chip identifying multiple available links defining multiple active paths to transfer packets from the source device to the destination device;
   said source interconnect chip, creating a plurality of packets with a generation identifier (ID) and an End-to-End (ETE) sequence number;

said source interconnect chip transmitting the plurality of packets to said destination interconnect chip via multiple active paths; and said destination interconnect chip receiving the plurality of packets, comparing the generation identifier in a packet of the plurality of packets with a current value of the generation ID of the packet of the plurality of packets to determine whether the packet is a valid packet, reordering the received valid packets into a correct order based upon the ETE sequence number before sending a validated plurality of packets to the destination device.

17. The multiple-path local rack interconnect system as recited in claim 16 wherein said source interconnect chip negotiates an update of the generation ID with said destination interconnect chip, responsive to said source interconnect chip being required to retransmit the plurality of packets to the destination interconnect chip.

18. The multiple-path local rack interconnect system as recited in claim 17 includes said destination interconnect chip discarding all of the plurality of packets stored in a packet receive buffer from said source interconnect chip, and said destination interconnect chip sending an ETE acknowledge message with a next expected ETE sequence number to said source interconnect chip.

19. The multiple-path local rack interconnect system as recited in claim 18 includes said destination interconnect chip discarding all of the plurality of packets stored in a packet receive buffer from said source interconnect chip, and said destination interconnect chip sending an ETE acknowledge message with a next expected ETE sequence number to said source interconnect chip; and said source interconnect chip discarding each packet of the plurality of packets acknowledged by said next expected ETE sequence number, and source interconnect chip transmits the plurality of packets starting with said next expected ETE sequence number with said updated generation ID.

20. The multiple-path local rack interconnect system as recited in claim 16 further includes a packet self-destruct timer circuit with a packet queue of the plurality of packets in an interconnect chip, said self-destruct timer circuit removing long-lived packets of the plurality of packets.

* * * * *